(12) United States Patent
Takayama et al.

(10) Patent No.: US 11,521,109 B2
(45) Date of Patent: Dec. 6, 2022

(54) INFORMATION PROCESSING APPARATUS AND METHOD OF CONTROLLING INFORMATION PROCESSING APPARATUS

(71) Applicant: CANON KABUSHIKI KAISHA, Tokyo (JP)

(72) Inventors: Kei Takayama, Tokyo (JP); Masakazu Matsugu, Yokohama (JP); Atsushi Nogami, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 620 days.

(21) Appl. No.: 16/110,124

(22) Filed: Aug. 23, 2018

(65) Prior Publication Data

US 2019/0065995 A1 Feb. 28, 2019

(30) Foreign Application Priority Data

Aug. 31, 2017 (JP) .............................. JP2017-167660

(51) Int. Cl.
*G06N 20/00* (2019.01)

(52) U.S. Cl.
CPC .................................... *G06N 20/00* (2019.01)

(58) Field of Classification Search
CPC ............ G06N 20/00; G06T 7/10; G06T 3/403
See application file for complete search history.

(56) References Cited

U.S. PATENT DOCUMENTS

| 2010/0138369 | A1* | 6/2010 | Ando ....................... G09B 7/02 706/12 |
| 2015/0193698 | A1 | 7/2015 | Nakamura et al. | |

FOREIGN PATENT DOCUMENTS

JP 2015129988 A 7/2015

OTHER PUBLICATIONS

Bongjin Jun, Daijin Kim, Robust face detection using local gradient patterns and evidence accumulation, Pattern Recognition, vol. 45, Issue 9, 2012, pp. 3304-3316, ISSN 0031-3203, https://doi.org/10.1016/j.patcog.2012.02.031. (http://www.sciencedirect.com/science/article/pii/S0031320312001094) (Year: 2012).*

(Continued)

*Primary Examiner* — Eric Nilsson
*Assistant Examiner* — Michael H Hoang
(74) *Attorney, Agent, or Firm* — Rossi, Kimms & McDowell LLP

(57) ABSTRACT

An information processing apparatus comprises a storage unit configured to store correct answer data used to detect at least one portion of a detection object from an image and detection data detected as the at least one portion of the detection object from the image; a target determination unit configured to extract mismatching data between the correct answer data and the detection data, which exists within a predetermined range from a region in which the correct answer data and the detection data match, and determine the mismatching data as evaluation target data; an investigation unit configured to investigate property information of the evaluation target data; and an error determination unit configured to determine, based on the property information, whether the evaluation target data is error candidate data of the correct answer data.

23 Claims, 14 Drawing Sheets

(56) References Cited

OTHER PUBLICATIONS

Lee, Younghyun & Han, David & ko, Hanseok. (2013). Reinforced AdaBoost Learning for Object Detection with Local Pattern Representations. TheScientificWorldJournal. 2013. 153465. 10.1155/2013/153465. https://www.hindawi.com/journals/tswj/2013/153465/ (Year: 2013).*

Abualkibash, Munther, Ausif Mahmood, and Saeid Moslehpour. "A near real-time, parallel and distributed adaptive object detection and retraining framework based on AdaBoost algorithm." 2015 IEEE High Performance Extreme Computing Conference (HPEC). IEEE, 2015. (Year: 2015).*

[Item U continued] https://ieeexplore.ieee.org/stamp/stamp.jsp?tp=&arnumber=7322446&tag=1.*

\* cited by examiner

FIG. 2
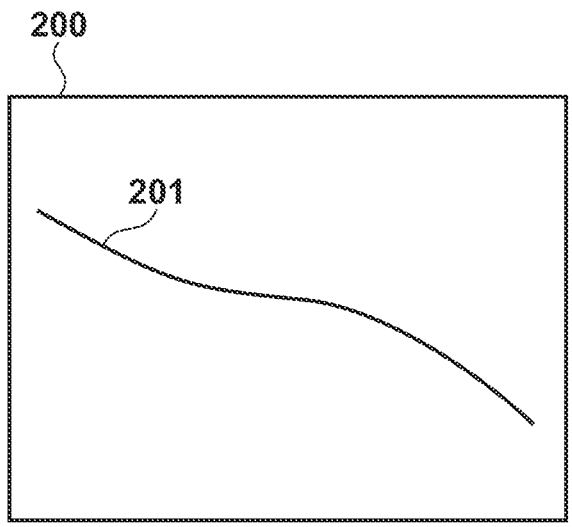
IDEAL CORRECT ANSWER IMAGE
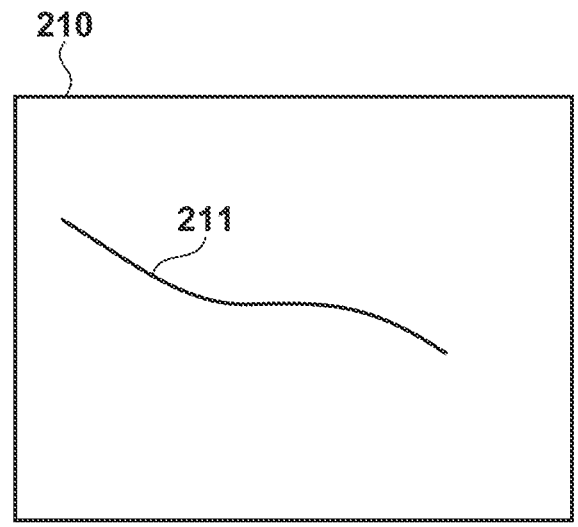
ACTUAL CORRECT ANSWER IMAGE
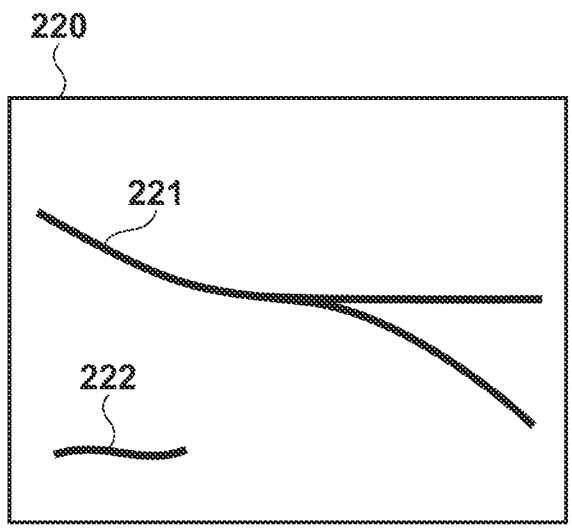
DETECTION IMAGE
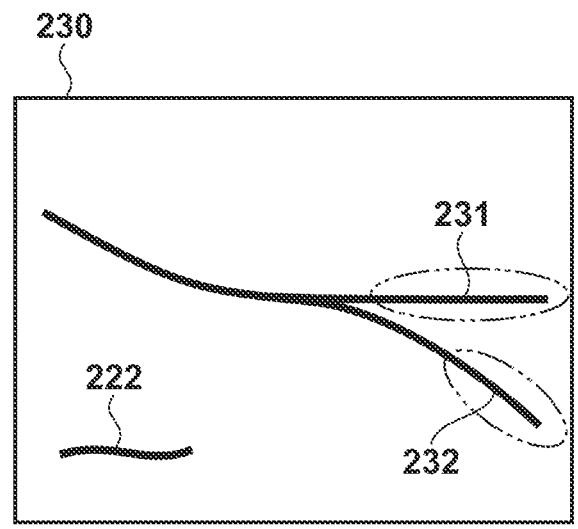
DETECTION IMAGE

F I G. 3A  LINK INFORMATION

| EVALUATION TARGET DATA | RELIABLE PORTION |
|---|---|
| 231 | 211 |
| 232 | 211 |
| 233 | 211 |

F I G. 3B  PAST DATA

| ERROR CANDIDATE DATA | ANGLE | LENGTH | ... | LOOP COUNT | EMPLOYMENT PROPRIETY INFORMATION |
|---|---|---|---|---|---|
| p1 | 90 | 35 | ... | 0 | 0 |
| p2 | 145 | 18 | ... | 0 | 1 |
| p3 | -40 | 12 | ... | 1 | 0 |

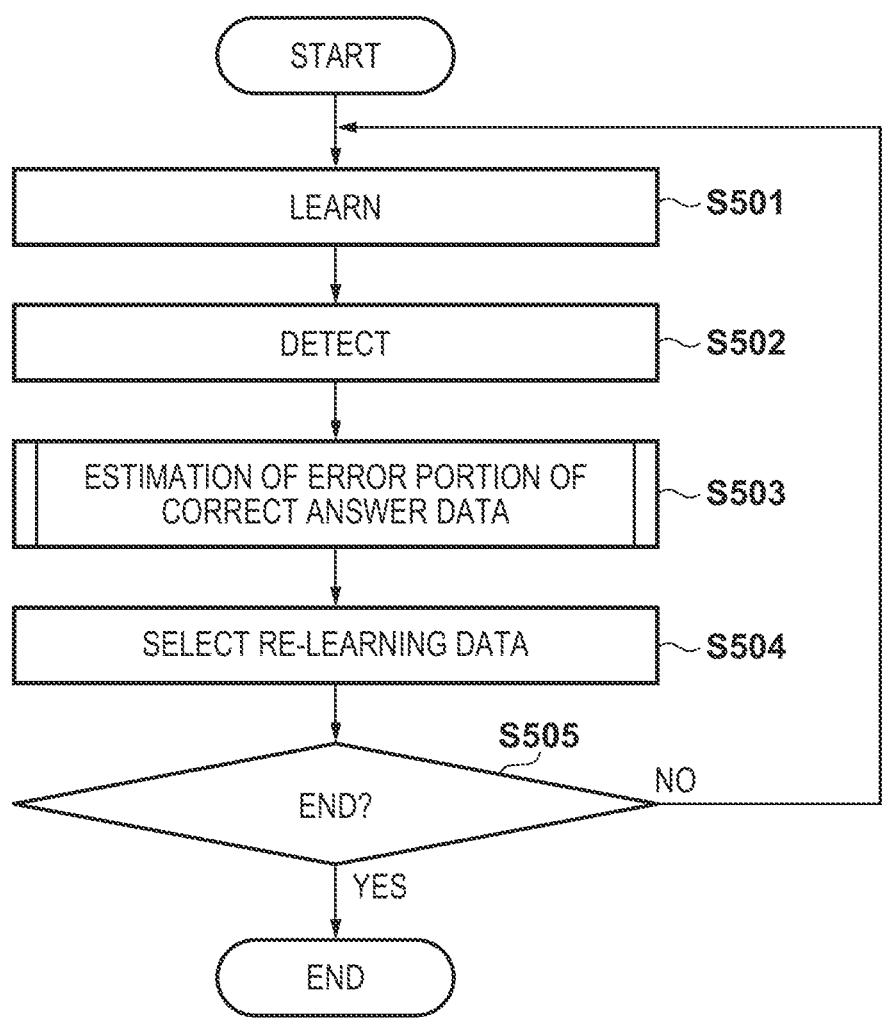

FIG. 11
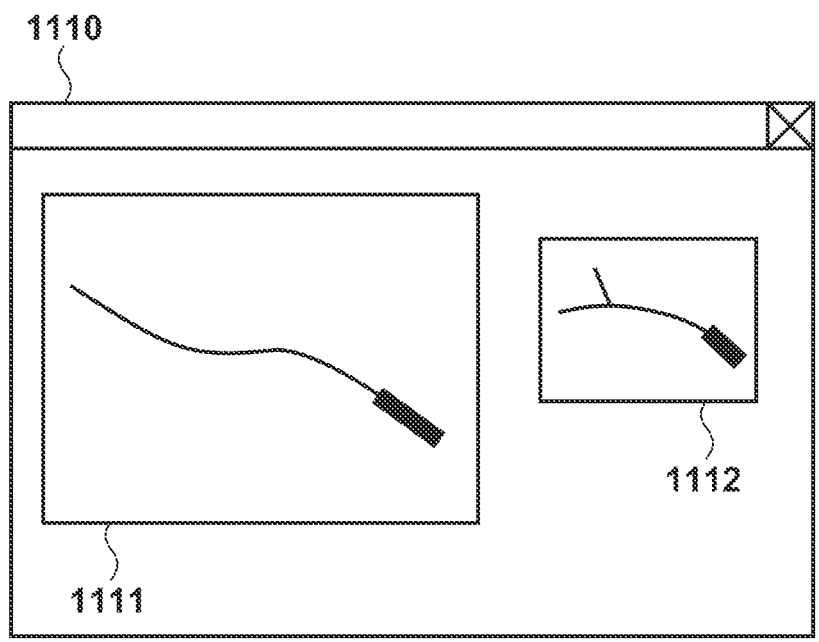
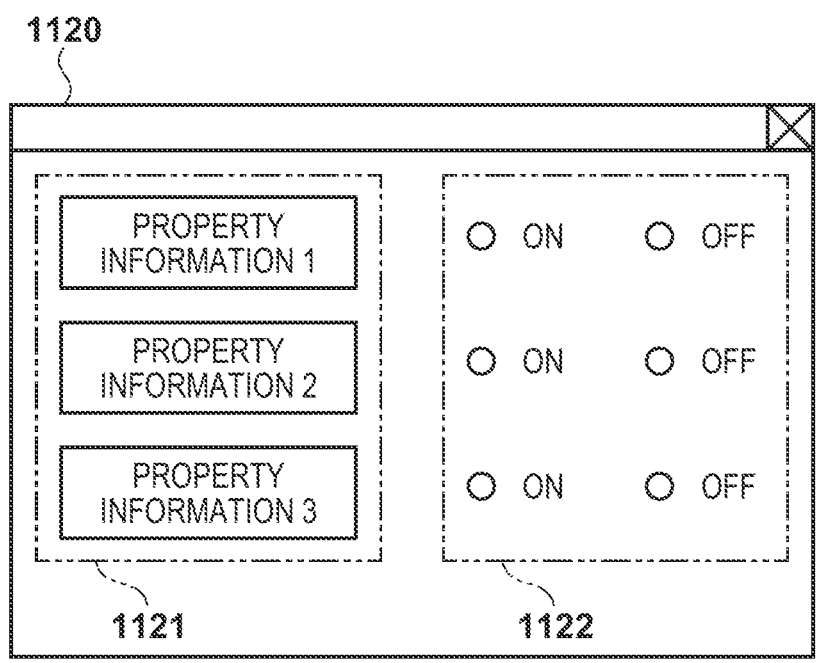

CORRECT ANSWER IMAGE

DETECTION IMAGE

CORRECT ANSWER IMAGE

DETECTION IMAGE

INFORMATION PROCESSING APPARATUS AND METHOD OF CONTROLLING INFORMATION PROCESSING APPARATUS

BACKGROUND OF THE INVENTION

Field of the Invention

The present invention relates to an information processing apparatus and a method of controlling the information processing apparatus and, more particularly, to a technique of modifying correct answer data used for machine learning.

Description of the Related Art

In the field of machine learning, aiming at automating detection of a detection target in an image, many studies to recognize a region in an image as a specific class have been carried out. In machine learning, a model used to recognize the region of a specific class on an image is constituted using, as correct answer data, an enormous amount of data in which the region of each class to be recognized on the image is manually labelled. However, it is difficult to manually input or set exact correct answer data via human visual recognition. This is because when the correct answer data labeling operation is performed for an enormous amount of data, errors readily occur.

Errors of correct answer data include an uninput and an error input. If an uninput portion exists, an image region including a detection target is erroneously learned as a non-detection target region. To the contrary, if an error input portion exists, a non-detection target region is erroneously learned as a detection target region. Since such wrong learning lowers the detection performance of the model, the exactness of correct answer data is important.

On the other hand, there is a method of applying a model halfway through learning to an image and, if detection data and correct answer data do not match, causing a user to confirm correct answer data. However, confirming all mismatching data becomes a burden on the user. Japanese Patent Laid-Open No. 2015-129988 discloses a method of selecting data to be confirmed by a user based on an index called certainty factor in a case in which detection data and correct answer data do not match. Because an image to be shown to the user is selected, the burden on the user is relative small.

However, the technique described in Japanese Patent Laid-Open No. 2015-129988 is an example in a case in which one label is added to one entire detection object. When labeling is done for each part of one detection object, an error of correct answer data cannot be estimated.

The present invention has been made in consideration of the above-described problem, and provides a technique for estimating an error portion of correct answer data for each part of a detection object.

SUMMARY OF THE INVENTION

According to one aspect of the present invention, there is provided an information processing apparatus comprises a storage unit configured to store correct answer data used to detect at least one portion of a detection object from an image and detection data detected as the at least one portion of the detection object from the image; a target determination unit configured to extract mismatching data between the correct answer data and the detection data, which exists within a predetermined range from a region in which the correct answer data and the detection data match, and determine the mismatching data as evaluation target data; an investigation unit configured to investigate property information of the evaluation target data; and an error determination unit configured to determine, based on the property information, whether the evaluation target data is error candidate data of the correct answer data.

Further features of the present invention will become apparent from the following description of exemplary embodiments with reference to the attached drawings.

BRIEF DESCRIPTION OF THE DRAWINGS

FIG. 2 is a view showing correct answer images and detection images according to the first to third embodiments;

FIGS. 3A and 3B are views for explaining the data formats of link information and past data;

FIG. 5 is a flowchart showing the procedure of overall processing of hard negative learning;

FIG. 11 is a view showing examples of display screens according to the third embodiment;

DESCRIPTION OF THE EMBODIMENTS

Figure 1:
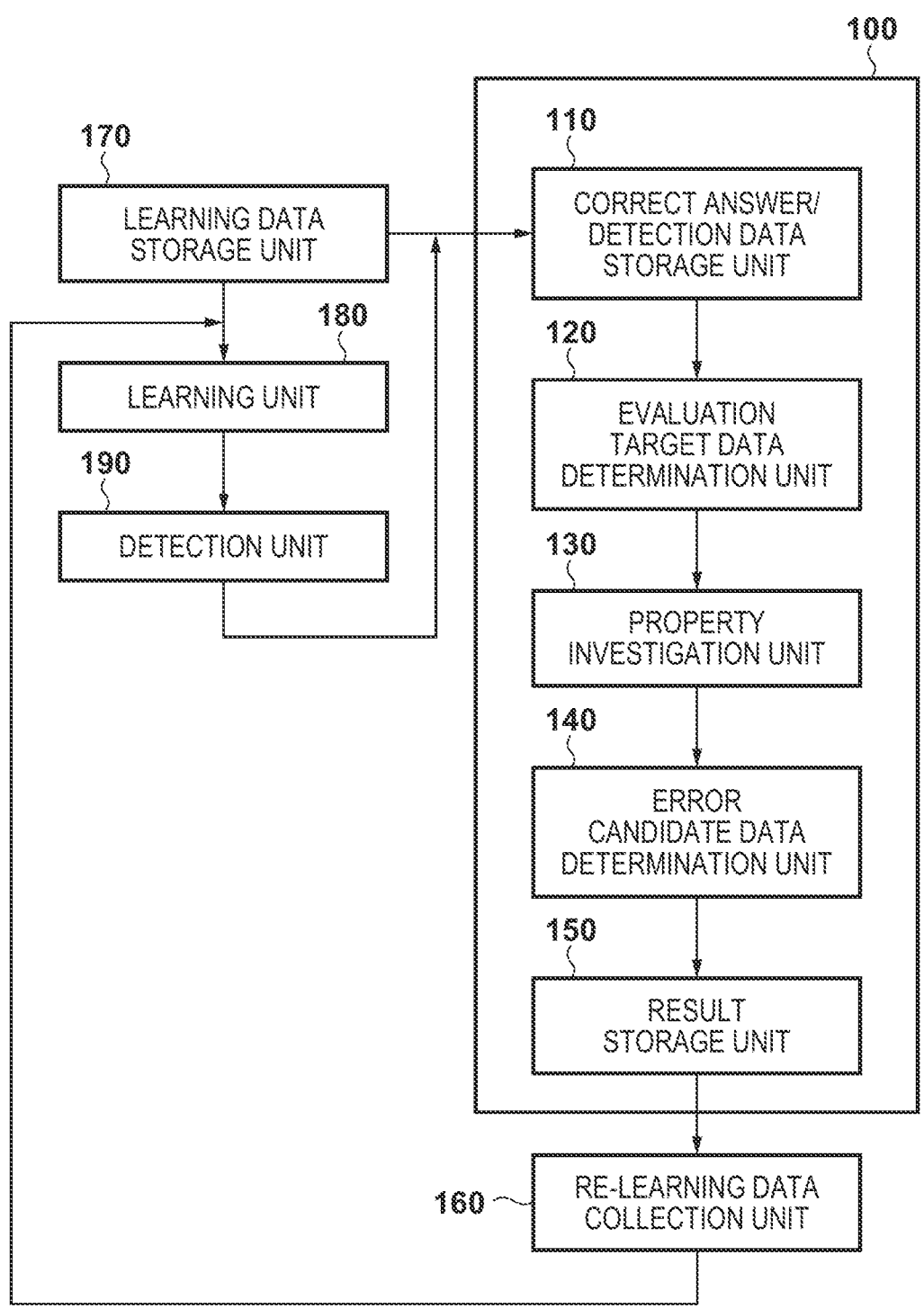
FIG. 1 is a block diagram showing the arrangement of an information processing system and an information processing apparatus according to the first embodiment.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

In the first embodiment, an example in which an information processing apparatus according to the present invention is applied to hard negative learning will be described. Hard negative learning is a method of applying a model halfway through learning to an image, collecting images including erroneously detected data, and intensively learning them. By applying the present invention to this repetitive learning, accurate learning data sets free from errors are collected and used as re-learning data.

In this embodiment, as an example of a case in which a specific detection target in an image is detected, a method in which a crack on a concrete wall surface is defined as a detection target, and an uninput portion of an error of correct answer data is estimated will be described.

<Outline>

In this embodiment, since an estimation target is an uninput portion, the occurrence tendency of uninput and estimation of an uninput portion will be described. First, the occurrence tendency of uninput will be described. Uninput tends to occur on the periphery of an input portion when correct answer data is input to an enormous amount of data. As a cause of the occurrence of uninput, the user is preoccupied by a main input target in an image and overlooks an input target on the periphery. For this reason, if a portion having information representing that the portion is likely to be an input target exists on the periphery of correct answer data, there is a possibility that the uninput portion can be estimated by linking the data with the correct answer data and thus expanding and changing the correct answer data.

In this embodiment, as information representing input target likeness, detection data obtained by performing detection processing for an image is used, and an error portion of correct answer data is estimated. Certainly, since both correct answer data and detection data include an error, they are not completely reliable. However, a portion that has the label of correct answer data and can be detected can be considered to be more reliable as correct answer data than a portion that does not have the label and cannot be detected. For this reason, a portion where the positions (pixel positions) of correct answer data and detection data match is defined as a reliable portion.

To the contrary, mismatching portions include two types of data, that is, overdetection data and overinput data. They will be defined as mismatching data altogether. Overdetection data is detection data whose position does not match the position of correct answer data in the detection data. Overinput data is correct answer data whose position does not match the position of detection data. In this embodiment, to estimate an uninput portion, focus is placed on the overdetection data of mismatching data. If overdetection data exists at a position on the periphery of a reliable portion, it is estimated that the overdetection data may be a portion where the correct answer data is not input. As a matter of course, since the overdetection data includes not only a portion that should be correct answer data but also a detection error portion, it is necessary to estimate a portion that may be correct answer data.

In processing according to the present invention, focus is placed on overdetection data on the periphery of a reliable portion, and it is estimated whether data of interest is an uninput portion based on property information such as shape information or color information on an original image.

As described above, in this embodiment, it is estimated, based on property information, whether overdetection data on the periphery of a portion reliable as correct answer data is an uninput portion of correct answer data in an image.

<System Arrangement>

An information processing apparatus 100 that constitutes a system in hard negative learning and associated constituent elements will be described next with reference to FIG. 1. The information processing apparatus 100 and the associated constituent elements can be implemented by executing software (program) obtained via a network or various kinds of recording media by a computer formed from a CPU, a memory, a storage device, an input/output device, a bus, a display device, and the like. Note that as for the computer, a general-purpose computer may be used, or hardware designed to be optimum to the software according to the present invention may be used.

An overall arrangement for executing hard negative learning will be described first. Constituent elements for hard negative learning include the information processing apparatus 100, a learning data storage unit 170, a learning unit 180, a detection unit 190, and a re-learning data collection unit 160. Correct answer data and an original image are stored as learning data in the learning data storage unit 170. The learning unit 180 performs learning of a detection model using the correct answer data and the original image. The detection unit 190 obtains detection data by applying the detection model to the original image. The information processing apparatus 100 obtains the detection data obtained by the detection unit 190 and the correct answer data stored in the learning data storage unit 170, estimates an error portion of the correct answer data, and stores information of error candidate data as the estimation result.

The error candidate data is pixel-based data. If the estimation target is estimated to be an uninput portion, the portion is put into a group of a continuous region. If the estimation target is estimated to be an error input portion, the portion is put into a group of continuous region.

In learning data that does not include error candidate data, correct answer data is accurate at a high possibility. Hence, the re-learning data collection unit 160 collects the data as re-learning data. The re-learning data is output to the learning unit 180 and used for re-learning.

<Arrangement of Information Processing Apparatus>

The arrangement of the information processing apparatus 100 according to this embodiment will be described next. The information processing apparatus 100 includes a correct answer/detection data storage unit 110, an evaluation target data determination unit 120, a property investigation unit 130, an error candidate data determination unit 140, and a result storage unit 150. The operation of each processing unit is controlled by reading out a program from a memory (not shown) and executing it by a CPU (not shown).

[Correct Answer/Detection Data Storage Unit 110]

The correct answer/detection data storage unit 110 stores sets of correct answer data and detection data. Images and data to be handled will be described here. A detection object to be handled in this embodiment will be described first. The detection object includes a linear element such as a crack, a still object, and a moving object. An image before detection processing of the detection object will be referred to as an original image. The original image may be an RGB image or a grayscale image in a state before detection processing is performed, or may be an image obtained by performing noise removal for these images.

Correct answer data and detection data will be described next with reference to FIG. 2. In each of images 200 and 210 shown in FIG. 2, correct answer data is located on a correct answer image. In each of images 220 and 230, detection data is located on a detection image.

The correct answer image is an image in which a value of 0 is stored in the background, and a value different from the background, for example, a value of 1 is stored as a label in a pixel corresponding to a detection target position of the original image. The correct answer image is an image to which labels are assigned by a label inputter, but may be a detection image visually confirmed by a human. The image 200 is an example of an ideal correct answer image that accurately shows a crack position, and the image 210 is an example of a correct answer image for which the label inputter has actually executed labeling. Correct answer data 211 on the correct answer image 210 shows a state in which the length is short due to an input error of the label inputter as compared to correct answer data 201 on the ideal correct answer image 200.

Note that in this embodiment, a line or a region formed by continuous label pixels on a correct answer image is defined as one correct answer data. If correct answer data is linear and branches, each of components divided at the branching point may be defined as one correct answer data.

A detection image is a result obtained by performing processing of detecting a detection target for an image, which is an image having a score or probability of detection target likeness on a pixel basis or a binary image obtained by applying threshold processing for the image. In this embodiment, a continuous region of pixels at which a detection object is detected on the detection image is defined as one detection data. For example, in the image 220, detection data are regions 221 and 222.

[Evaluation Target Data Determination Unit 120]

The evaluation target data determination unit 120 obtains data from the correct answer/detection data storage unit 110, extracts mismatching data between correct answer data and detection data, and determines evaluation target data from the mismatching data (target determination). The evaluation target data is data of a target to estimate whether mismatching data is an error portion of the correct answer data. For example, the evaluation target data determination unit 120 extracts overdetection data from detection data as mismatching data, and determines evaluation target data in the overdetection data.

Processing of extracting overdetection data from detection data will be described first. As an overdetection data extraction method, a correct answer image in which the region of correct answer data is expanded is created, and a region remaining after subtraction of the correct answer image from the detection image is obtained as overdetection data. More specifically, when an image in which the region of the correct answer data 211 on the actual correct answer image 210 is expanded is subtracted from the detection image 220, regions 231 and 232 each surrounded by an alternate long and two short dashed line in the detection image 230 remain, in addition to the detection data 222. In this embodiment, each of these components is handled as one overdetection data.

Assume that different IDs are assigned to the correct answer data and the overdetection data. Note that in this embodiment, an embodiment in which correct answer data and detection data are held as image data will be described. However, the data holding method is not limited to this, and the data may be held by another method such as a vector format that represents correct answer data or detection data as a set of coordinate values.

Processing of determining evaluation target data from overdetection data will be described next. Of the overdetection data, the position of correct answer data and the position of detection data match. Data that exists within a predetermined range from a portion reliable as correct answer data is determined as evaluation target data. Then, the evaluation target data is used as the data of a target to estimate whether the data is an error portion of the correct answer data. Here, the mismatching portion is a portion where the correct answer data exists on the detection data. To the contrary, overdetection data that does not exist within the predetermined range from the correct answer data is not determined as evaluation target data and is excluded from the data of the target to estimate whether the data is an error portion.

Here, the predetermined range is determined using parameters such as the number of pixels, a length, and an area size. A database may be manually formed in advance on a case basis, and the parameters may be determined using the database. Alternatively, the parameters may be defined in accordance with the characteristic of the detection object. In this embodiment, to find an uninput portion of correct answer data on the extended line or at the branching position of a crack, overdetection data at a position adjacent to the portion reliable as correct answer data is determined as the evaluation target data.

Whether the data is adjacent is determined depending on whether the reliable portion exists at a pixel position on the periphery of the overdetection data of interest. For example, in the detection image 230, the overdetection data 231 and 232 are located at positions adjacent to the reliable portion 211 and are therefore determined as evaluation target data. On the other hand, the overdetection data 222 is not determined as evaluation target data because a reliable portion does not exist at an adjacent position on the correct answer image 210.

Note that although it is not indispensable for determining the evaluation target data from the overdetection data, if the reliable portion from which each evaluation target data exists within the predetermined range is recorded, the data can easily be handled by the processing of the property investigation unit 130 later. That both data exist within the predetermined range (for example, the range of a predetermined distance or the range of a predetermined area) is expressed as linked. As a link information recording method, a method of recording a portion reliable as correct answer data and the ID of evaluation target data in a table format can be used. For example, when overdetection data is linked with correct answer data, in a format shown in FIG. 3A, the ID of evaluation target data is stored in the first column, and the ID of a reliable portion is stored in the second column. This information will be referred to as link information.

[Property Investigation Unit 130, Error Candidate Data Determination Unit 140, and Result Storage Unit 150]

The property investigation unit 130 investigates property information that expresses, as numerical values, the information of each evaluation target data such as the shape information of evaluation target data determined by the evaluation target data determination unit 120 and color information at a corresponding position on the original image. Based on the property information investigated by the property investigation unit 130, the error candidate data determination unit 140 determines, using a method by rule base or machine learning, error candidate data as an error portion of the correct answer data.

The property information includes the property information of the evaluation target data for the portion reliable as the correct answer data and the property information of the evaluation target data itself. When investigating the first property information, the ID of the reliable portion linked with the evaluation target data is used. Hence, it is necessary to record the link information by the evaluation target data determination unit 120.

Figure 4A:
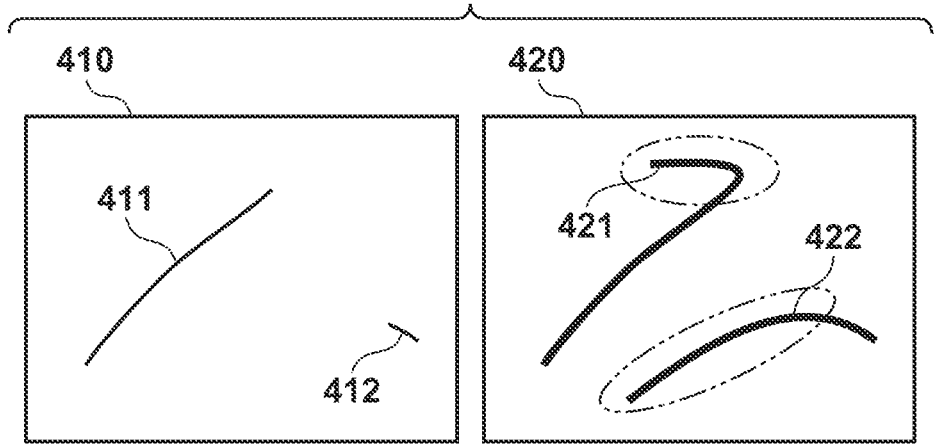
FIGS. 4A to 4C are views for explaining processing of estimating an uninput portion of correct answer data using property information according to the first embodiment.
Figure 4B:
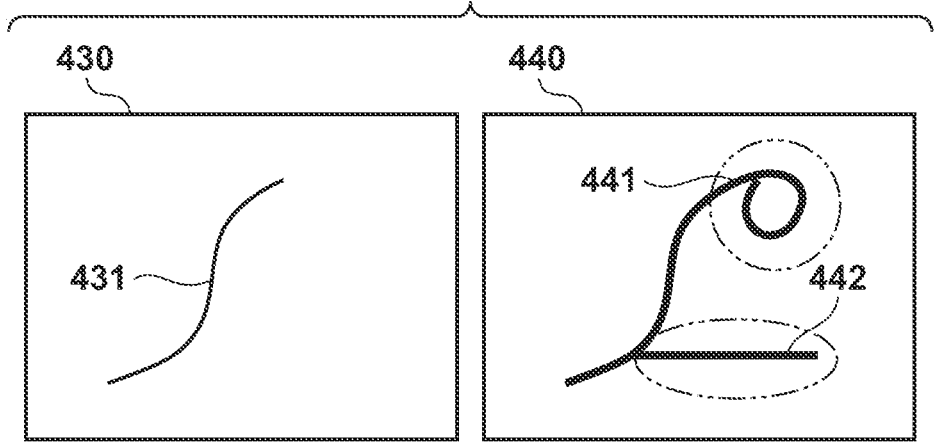
Figure 4C:
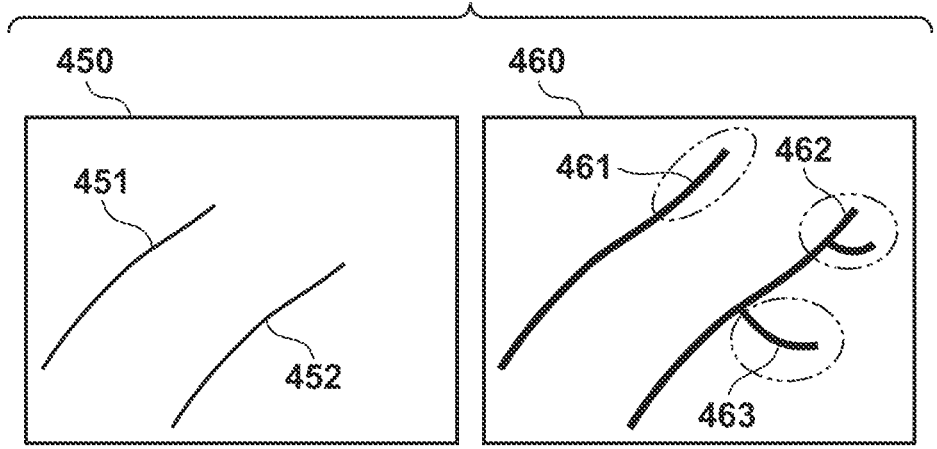

In cases shown in FIGS. 4A to 4C, the shape information of evaluation target data is investigated as property information, and a shape that cannot be a detection target is determined by rule base, thereby determining each evaluation target data of a shape other than the shape as error candidate data. Images 420, 440, and 460 are detection images, and images 410, 430 and 450 are the correct answer images of the detection images. Regions 421, 422, 441, 442, 461, 462, and 463 each surrounded by an alternate long and two short dashed line in the detection images are evaluation target data.

An example in which error candidate data is determined based on the shape information of evaluation target data for a reliable portion will be described first with reference to FIG. 4A. Here, pieces of information such as the degree of matching of the angle of evaluation target data to the reliable portion and the length and area of a region are investigated as the shape information. As for how to investigate, for example, a method of investigating the vector from one end point to the other end point of each of the reliable portion and the evaluation target data and comparing the lengths or angles is used.

The evaluation target data 421 of the detection image 420 shown in FIG. 4A is linked with a reliable portion 411 but has a largely different angle. It is difficult to assume that a crack has a shape with an abruptly changing angle, like the evaluation target data 421. It can therefore be estimated that the evaluation target data 421 is not an uninput portion of correct answer data but a mere error detection portion, that is, the evaluation target data is not an error of correct answer data. For this reason, it is determined that the evaluation target data 421 that is overdetection data is not error candidate data.

The evaluation target data 422 is linked with a reliable portion 412 but is extremely long as compared to correct answer data. If the evaluation target data is too long, it can hardly be considered that the user has forgotten to input the whole data. For this reason, it is determined that the evaluation target data is not error candidate data.

An example in which error candidate data is determined based on the shape information of evaluation target data itself will be described next with reference to FIG. 4B. As an example of the shape information of the evaluation target data itself, the shape information includes at least some of the linearity, angle, circularity, length, loop count, and the like of the region of the evaluation target data. The evaluation target data 441 of the detection image 440 shown in FIG. 4B draws a loop and has a round shape. Hence, the shape can hardly be assumed to be a crack, and this may be data obtained by erroneously detecting a round hole on the wall surface. Since the evaluation target data 442 is linear and faces in the horizontal direction, this may be data obtained by erroneously detecting an artificial crevice on the wall surface. Hence, these regions are unnatural as a crack shape and it can be determined that the data are not error candidate data.

Processing of applying a plurality of rules used to determine that data is not error candidate data to the evaluation target data has been described above. To the contrary, evaluation target data that does not meet the condition to determine that data is not error candidate data is determined as error candidate data. All the evaluation target data 461, 462, and 463 of the detection image 460 shown in FIG. 4C do not meet the above-described condition and are therefore determined as error candidate data.

Note that in the examples shown in FIGS. 4A and 4B, the shape information of the evaluation target data for the portion reliable as correct answer data and the shape information of the evaluation target data itself are separately used. However, both may be used.

The position information of each error candidate data determined by the error candidate data determination unit 140 is output to the result storage unit 150. The result storage unit 150 stores the information of each error candidate data determined by the error candidate data determination unit 140. An image including error candidate data is data that may include an error in correct answer data. In this embodiment, the image including error candidate data is excluded from learning data, thereby performing re-learning using correct answer data with less uninput portions.

With the above-described processing, an error portion of correct answer data can be estimated using detection data and correct answer data. In addition, when the processing is looped a plurality of times, excellent model leaning and more accurate error portion estimation can be performed.

<Processing>

The procedure of overall processing of hard negative learning will be described next with reference to the flowchart of FIG. 5. In step S501 shown in FIG. 5, the learning unit 180 performs learning of a detection model for detection processing using correct answer data and an original image. In step S502, the detection unit 190 obtains detection data by applying the detection model to the original image. In step S503, the information processing apparatus 100 estimates an error portion of the correct answer data using the correct answer data and the detection data.

In step S504, the re-learning data collection unit 160 selects, as re-learning data, learning data that does not include error candidate data based on the error portion estimation result. In step S505, the re-learning data collection unit 160 determines whether to end the processing or not. If the processing is not to be ended, the process returns to step S501 to perform learning using the re-learning data. A case in which the processing is to be ended is a case in which there is no more error candidate data or a case in which an end operation is accepted from the user. The series of processes shown in FIG. 5 thus ends.

Figure 6:
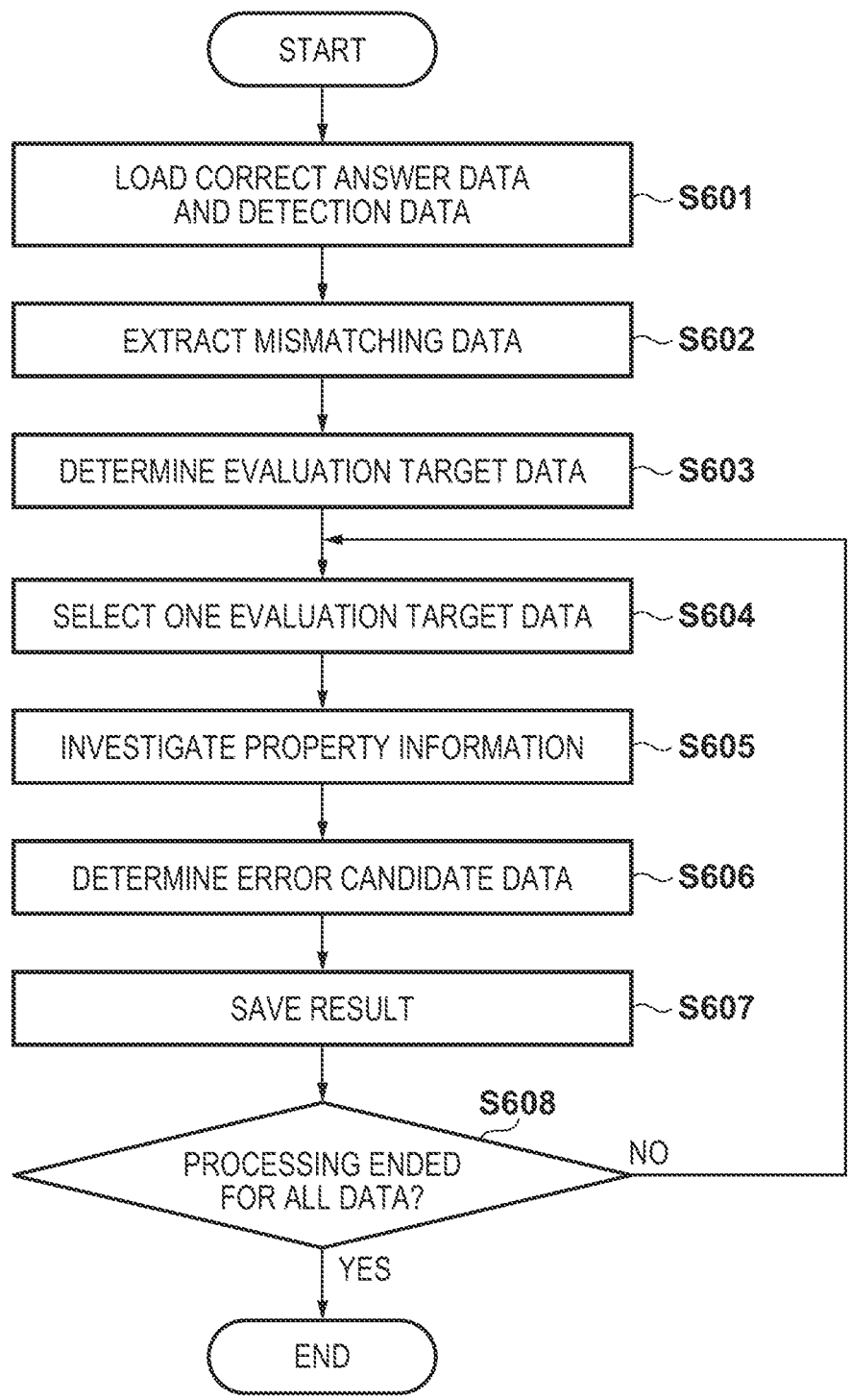
FIG. 6 is a flowchart showing the procedure of processing executed by the information processing apparatus according to the first embodiment.

The procedure of processing executed by the information processing apparatus according to this embodiment will be described next with reference to the flowchart of FIG. 6. The processing shown in FIG. 6 is processing performed in a case in which one image is the target. In step S601, the evaluation target data determination unit 120 loads correct answer data and detection data from the correct answer/detection data storage unit 110. In step S602, the evaluation target data determination unit 120 detects overdetection data as mismatching data from the difference between the correct answer data and the detection data. In step S603, if the overdetection data exists within a predetermined range from a portion reliable as correct answer data, the evaluation target data determination unit 120 determines the overdetection data as evaluation target data.

In step S604, the evaluation target data determination unit 120 selects one evaluation target data from the determined evaluation target data. In step S605, the property investigation unit 130 investigates the property information of the selected evaluation target data. The property information is the shape information of the evaluation target data or color information at a corresponding position on the original image.

In step S606, the error candidate data determination unit 140 determines, based on the property information, whether the evaluation target data is error candidate data. In step S607, the result storage unit 150 stores the information of the error candidate data determined by the error candidate data determination unit 140. In step S608, the error candidate data determination unit 140 determines whether the processing has been ended for all evaluation target data in the image. If the processing is completed for all evaluation target data, the series of processes ends. On the other hand, if the processing is not completed for all evaluation target data, the process returns to step S604 to continue the processing.

The series of processes shown in FIG. 6 thus ends. Note that in the example shown in FIG. 6, the description has been made assuming that one image is the target. However, a plurality of images may be targets. In this case, the determination processing of step S608 may be executed for the plurality of images at once.

As described above, according to this embodiment, an error portion of correct answer data can be estimated on a pixel basis using detection data and the correct answer data.

Second Embodiment

In the first embodiment, an embodiment in which an uninput portion in an image is estimated, data that can impede learning is removed, and learning is then performed has been described. In the second embodiment, however, an example in which error candidate data is presented to a user using a user interface as a region in which correct answer data is possibly wrong, and the user is caused to perform confirmation and modification operations will be described. This makes it possible to accurately modify correct answer data and perform learning using more accurate correct answer data. In the second embodiment, the detection target is a crack on a structure wall surface, and an uninput portion is estimated as an error of correct answer data. By the modification, for example, correct answer data 211 of an actual correct answer image 210 shown in FIG. 2 is assumed to be made close to correct answer data 201 of an ideal correct answer image 200.

<System Arrangement and Apparatus Arrangement>

Figure 7:
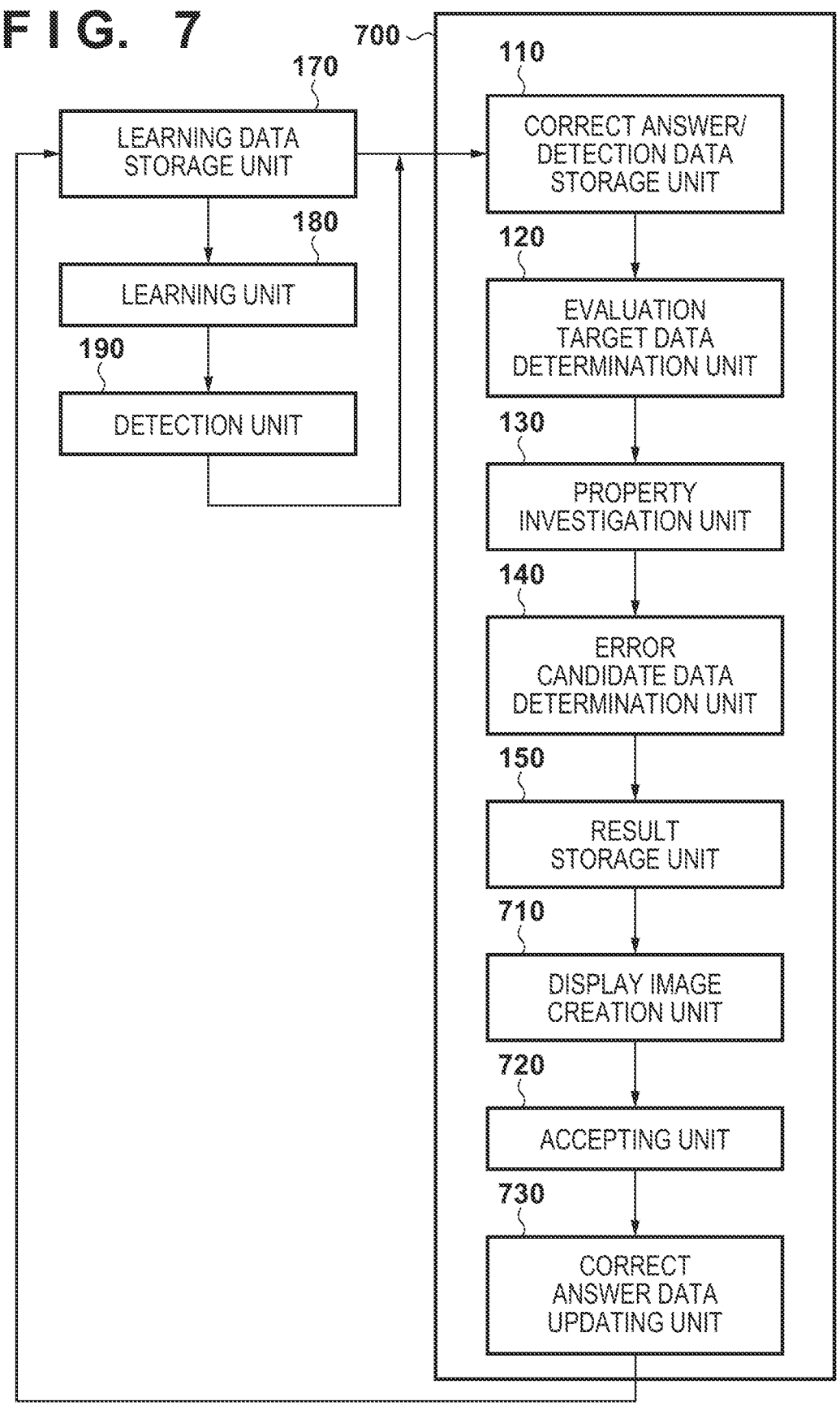
FIG. 7 is a block diagram showing the arrangement of an information processing system and an information processing apparatus according to the second embodiment.

An information processing apparatus 700 that constitutes a system according to this embodiment and associated constituent elements will be described next with reference to FIG. 7. The system according to this embodiment includes the information processing apparatus 700, a learning data storage unit 170, a learning unit 180, and a detection unit 190.

The information processing apparatus 700 includes a display image creation unit 710, an accepting unit 720, and a correct answer data updating unit 730 in addition to the constituent elements of the information processing apparatus 100 explained in the first embodiment. The difference from the first embodiment is that the user is promoted to do confirmation and modification using a user interface.

[Display Image Creation Unit 710]

The display image creation unit 710 obtains the information of error candidate data output from a result storage unit 150, and creates a display image for a display screen used to cause the user to do confirmation. The display image in which correct answer data and the error candidate data are superimposed on an original image is displayed on the display screen. When only the error candidate data of detection data is displayed, the user can confirm a portion to be confirmed on a pixel basis. In addition, visibility may be improved by using a transparent color or a color different from the correct answer data for the error candidate data or adding a function of switching between display and non-display of evaluation target data at a timing to hit a key of a keyboard.

Figure 8:
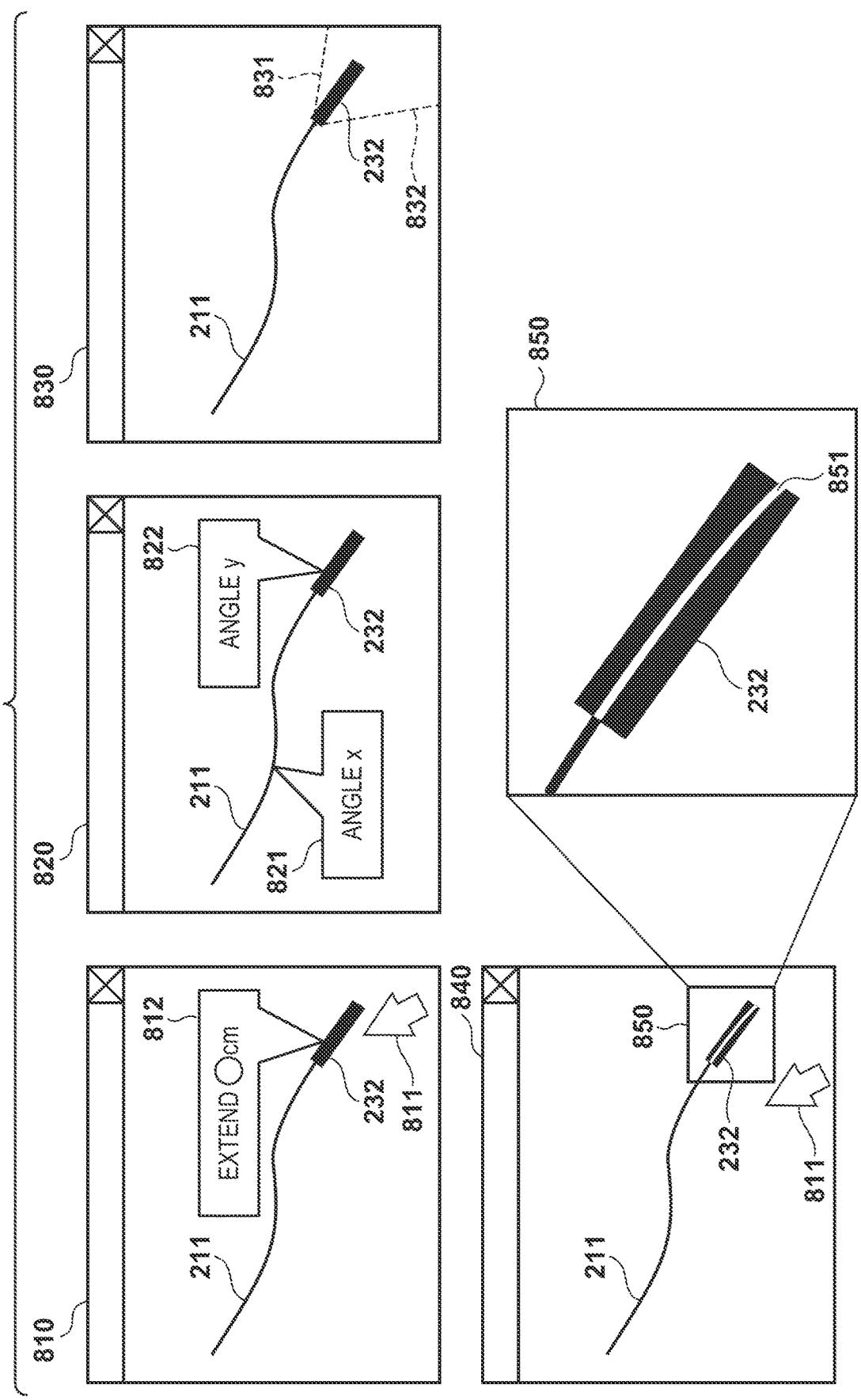
FIG. 8 is a view showing examples of display screens according to the second embodiment.

Here, a window 810 in FIG. 8 shows a detailed example of the display screen. The display image displayed on the display screen is an image in which the correct answer data 211 and error candidate data 232 are superimposed on the original image. These data are the same as the data of the same reference numerals in FIG. 2. In the window 810, the error candidate data 232 is directly superimposed. However, the error candidate data 232 may be superimposed after processing such as thinning or vectorization. In addition, as indicated by a balloon 812, property information such as the length of the error candidate data 232 may be added.

On the display screen, not only the error candidate data 232 on a pixel basis but also a reason why the user is promoted to do confirmation can be displayed. As one type of reason display method, the basis is presented by a character or an image. For example, as indicated by balloons 821 and 822 in a window 820, an angle from one end point to the other end point of each of the correct answer data 211 and the error candidate data 232 is displayed. As another display method, a range in which overdetection data is estimated as an uninput portion is presented based on the property information of the correct answer data. A region surrounded by broken lines 831 and 832 in a window 830 is a region in which evaluation target data is determined as error candidate data.

[Accepting Unit 720]

The accepting unit 720 presents the display image created by the display image creation unit 710 to the user, and accepts confirmation and modification operations. The user views the confirmation screen, determines whether to employ the error candidate data as an uninput portion, and modifies the correct answer data.

There are two methods of applying modification by the user. One is a method of selecting the region of error candidate data on the screen. For example, the user selects the error candidate data 232 by a mouse pointer 811 on the display image in the window 810, thereby determining to employ the error candidate data. The other is a method of causing the user to redraw the line of a correct answer label (reinput correct answer data). For example, as indicated by a region 850 in a window 840, the user redraws a line 851 represented by a white line by moving the mouse pointer 811 with reference to the evaluation target data 232. The region selected or the line redrawn by the user in this way will be referred to as modification data hereinafter.

[Correct Answer Data Updating Unit 730]

The correct answer data updating unit 730 receives feedback of modification from the user, reflects the modification data to the correct answer data, and updates the correct answer data. More specifically, the modification data and the correct answer data are connected, thereby updating the correct answer data. Different processes are executed depending on whether the correct answer data and the modification data are linear or have regions.

When both the correct answer data and the modification data are linear, close data of the end points of the correct answer data and the modification data are selected and connected and updated as correct answer data. When both the correct answer data and the modification data are data having regions, processing of superimposing the modification data on the correct answer image is performed.

Note that if the correct answer data is linear, and the modification data has a region, processing of making the modification data linear in conforming with the correct answer data is necessary. For example, the correct answer data 201 of the ideal correct answer image 200 shown in FIG. 2 is created from the correct answer data 211 and the modification data 232 in the window 810. At this time, the modification data 232 is thinned and then connected to the closer end point of the correct answer data 211.

With the above-described procedure, error candidate data is presented to the user, the user is caused to perform the confirmation and modification operations, and the correct answer data is updated upon receiving feedback of the user. When the uninput portion is accurately modified, the performance of the detection model by learning can be improved.

Note that this embodiment can be used in a framework for causing the user to modify each correct answer data once or repetitively. In the framework of repetitive modification, processing of modifying correct answer data using detection data obtained by a detection model halfway through learning is repeated. By this processing, an information processing apparatus that presents a portion estimated as an uninput portion by a more accurate region can be implemented.

In addition, this embodiment can be used when the user assigns correct answer data. When the embodiment is used at the time of assignment of correct answer data, the detection model needs to be prepared in advance to detect the detection object. This makes it possible to obtain detection data by applying the detection model to the original image during input of correct answer data, make a set of the detection data and the correct answer data, and notify the user of an uninput portion in real time.

<Processing>

Figure 9:
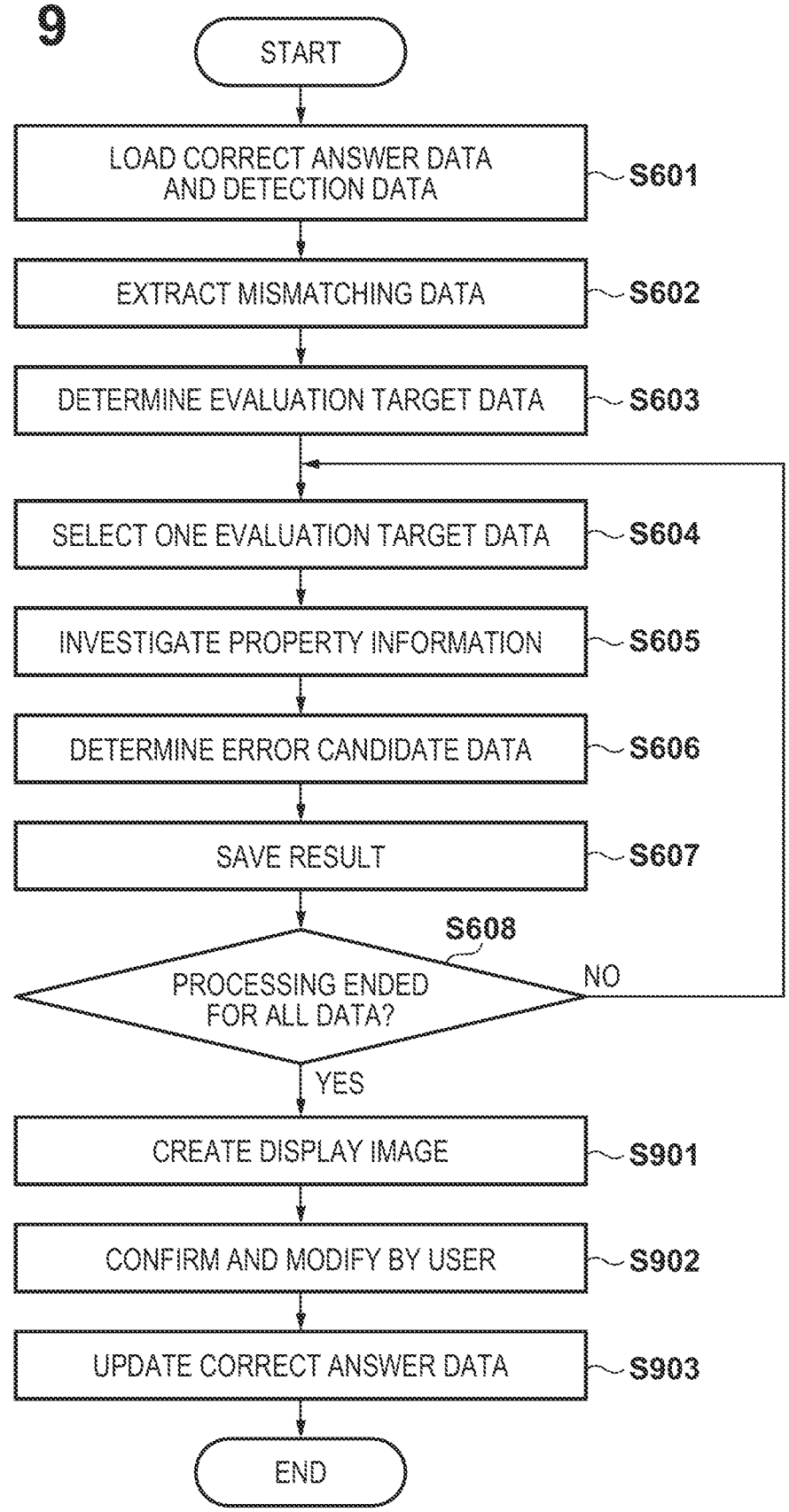
FIG. 9 is a flowchart showing the procedure of processing executed by the information processing apparatus according to the second embodiment.

The procedure of overall processing is the same as described next with reference to FIG. 5 in the first embodiment. The procedure of processing executed by the information processing apparatus according to this embodiment will be described next with reference to the flowchart of FIG. 9. The processes of steps S601 to S608 in FIG. 9 are the same as the processes of the same reference numerals in FIG. 6. In this embodiment, after the processing is ended for all evaluation target data in an image, the processes of steps S901 to S903 are further executed.

In step S901, the display image creation unit 710 obtains the information of error candidate data output from the result storage unit 150, and creates a display image for a display screen used to cause the user to do confirmation. In step S902, the accepting unit 720 presents the display image created by the display image creation unit 710 to the user, and accepts confirmation and modification operations. In step S903, the correct answer data updating unit 730 receives feedback of modification from the user, connects the modification data to the correct answer data, and updates the correct answer data.

The series of processes shown in FIG. 9 thus ends. Note that the three processes added in this embodiment may be performed immediately before step S608. The processing may be performed for each image or for a plurality of images at once.

As described above, according to this embodiment, error candidate data is presented to the user, the user is caused to perform the confirmation and modification operations, and the correct answer data is updated upon receiving feedback of the user. When the uninput portion is accurately modified, the performance of the detection model by learning can be improved.

Third Embodiment

In the second embodiment, an example in which error candidate data is presented to the user using the user interface, and the user is caused to perform the confirmation and modification operations has been described. In the third embodiment, however, a method of causing a user to do certain determination and using the information of an operation performed on a confirmation screen to decide a determination criterion of error candidate data will be described. In the third embodiment, the detection object is a crack on a structure wall surface, and an uninput portion of correct answer data is estimated. As property information, shape information is investigated.

<System Arrangement and Apparatus Arrangement>

Figure 10:
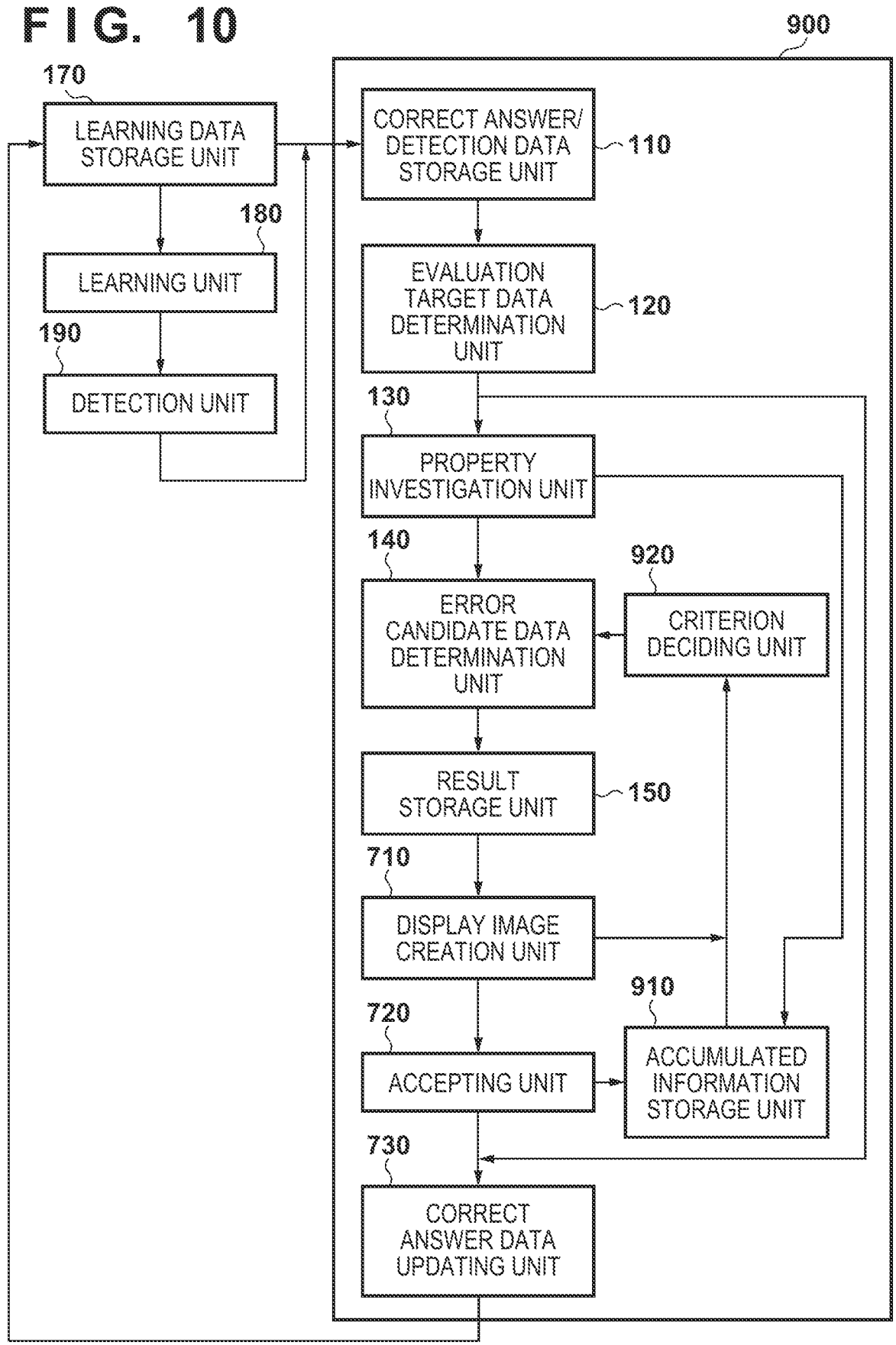
FIG. 10 is a block diagram showing the arrangement of an information processing system and an information processing apparatus according to the third embodiment.

An information processing apparatus 900 that constitutes a system according to this embodiment and associated constituent elements will be described next with reference to FIG. 10. The system according to this embodiment includes the information processing apparatus 900, a learning data storage unit 170, a learning unit 180, and a detection unit 190. The information processing apparatus 900 includes an accumulated information storage unit 910 and a criterion deciding unit 920 in addition to the constituent elements of the information processing apparatus 700 explained in the second embodiment.

[Accumulated Information Storage Unit 910]

The accumulated information storage unit 910 obtains the information of data confirmed by the user from an accepting unit 720, and stores the information. Past data and user setting information are stored in the accumulated information storage unit 910. These pieces of information are used by the criterion deciding unit 920 to decide the determination criterion of error candidate data. However, to decide the criterion, one or both of the past data and the user setting information can be used, and both of them need not always be used. Details of the past data and the user setting information will be described below.

The past data will be described first. The past data is data including the property information of error candidate data presented to the user in the past, and information that records whether the user has employed the error candidate data as an error portion (uninput portion). The latter information will be referred to as employment propriety information hereinafter. The employment propriety information and the property information of each error candidate data are stored for each error candidate data.

The past data can be created from data confirmed by the user so far in the detection object as the current processing target. Every time the past data is accumulated, the criterion deciding unit 920 updates the determination criterion. Alternatively, the past data may be created from data other than the detection object as the current processing target. In this case, the past data may be used as the initial determination criterion of error candidate data. For example, using the format of "past data" shown in FIG. 3B, shape information such as an angle, length, and loop count and employment propriety information are stored in association with each other as property information for each evaluation target data.

The user setting information will be described next. The user setting information is data obtained by executing a questionnaire for the user before the information processing apparatus according to this embodiment is applied to a new detection object. The user setting information includes setting information of the presence/absence of use of each property information and setting information of the reference value of each property information for determining evaluation target data as error candidate data. On the accepting unit 720, an investigation is made in advance concerning, for example, the size of evaluation target data to be confirmed, the angle difference between detection data and correct answer data which does not require confirmation, and the like. The user setting information can be used to decide the initial criterion for determination of error candidate data.

[Criterion Deciding Unit 920]

Based on the information stored in the accumulated information storage unit 910, the criterion deciding unit 920 decides a criterion to determine whether evaluation target data is error candidate data. As error candidate data determination methods, a method by machine learning and a method by rule base will be described.

In the method by machine learning, an equation used to determine whether each evaluation target data is error candidate data is formed using the past data, and error candidate data is determined based on the equation. Assuming that in the item of employment propriety information in "past data" shown in FIG. 3B, 1 is stored when the user employs error candidate data as an error of correct answer data, and 0 is stored when error candidate data is not employed, for example, a determination expression given by $$\hat{y} = \sum_{i=0}^{n} a_i x_i \quad (1)$$

is formed, where $x_i$ is the number of each property information item, $a_i$ is the weight of each property information item, n is the number of property items, and i is an index corresponding to it. An output value $\hat{y}$ is the estimated value of employment propriety information of evaluation target data. Learning is performed using formula (2). If the evaluation target data is employed data, a value close to 1 is output as the output value $\hat{y}$. Otherwise, a value close to 0 is output.

$$\sum_{i=0}^{n} (y - \hat{y})^2 \quad (2)$$

where y is the employment propriety information of the user. Learning is performed such that the square of the difference between the employment propriety information y and the estimated value $\hat{y}$ becomes close to 0, thereby deciding the weight $a_i$ of each property information item in equation (1).

An error candidate data determination unit 140 determines error candidate data from evaluation target data using the determination criterion (determination expression) decided by the criterion deciding unit 920. The property information of the evaluation target data is substituted into equation (1). It can be interpreted that if the output value (estimated value) is close to 1, the possibility that the data is an uninput portion is high, and if the output value is close to 0, the possibility that the data is not an uninput portion is high. Hence, if the estimated value $\hat{y}$ of evaluation target data is equal to or more than a threshold, the evaluation target data is determined as error candidate data.

On the other hand, in the method by rule base, the presence/absence of use of each property information in error candidate data determination processing is set. For the property information to be used, a reference value used to determine whether data is error candidate data is provided. When parameters concerning a length and an angle accepted from the user are obtained as user setting information, the parameters are set as the reference value for determination. The reference value and the property information of evaluation target data are compared, thereby determining error candidate data.

As described above, in the information processing apparatus 900 according to this embodiment, the criterion deciding unit 920 decides the determination criterion of error candidate data using information stored in the accumulated information storage unit 910. Then, based on the determination criterion decided by the criterion deciding unit 920, the error candidate data determination unit 140 estimates an uninput portion. However, in this case, a property investigation unit 130 needs to investigate property information of the same item between past data and evaluation target data for which the error candidate data determination unit 140 should estimate whether it is an uninput portion.

<User Interface>

A user interface used to collect employment propriety information and a user interface used to collect user setting information will be described next. A user interface for collection of employment propriety information will be described first. As indicated by a display screen 1110 shown in FIG. 11, there is a method of displaying images one by one and causing the user to do confirmation. Every time the user ends confirmation, employment propriety information is stored in the accumulated information storage unit 910 for each error candidate data. In addition, past data close to data to be confirmed by the user may be obtained from the accumulated information storage unit 910 and displayed on the same screen.

As indicated by the window of the display screen 1110 shown in FIG. 11, an image 1111 to be confirmed by the user and similar past data 1112 of close property information in the past data are displayed on the same screen. By such screen display, information representing what kind of determination has been done by the user in a similar case can be provided to the user, and the basis presented to the user can be provided to the user.

A user interface used to collect user setting information will be described next. A user interface concerning setting of the presence/absence of use of each property information and setting of the reference value of each property information in determining evaluation target data as error candidate data for obtaining of user setting information will be described.

In the setting of the presence/absence of use of each property information, the user interface is configured to be switchable using check boxes. For example, as indicated by the window of a display screen 1120 shown in FIG. 11, pieces of property information are displayed as a list in a region surrounded by an alternate long and two short dashed line 1121, and check boxes to select ON or OFF are displayed in a region surrounded by an alternate long and two short dashed line 1122. The user determines whether to use each property information. For each property information, when the property information is to be used, the check box of ON is selected. When the property information is not to be used, the check box of OFF is selected.

In the setting of the reference value of each property information, a question about the setting is asked to the user, and an answer is accepted. The question items include, for example, whether the user wants to confirm when extending from certain centimeter to certain centimeter, how much difference in angle between correct answer data and over-detection data is allowed, and the like. To these questions, the user answers by inputting numerical values in answer columns on the display screen.

<Processing>

Figure 12:
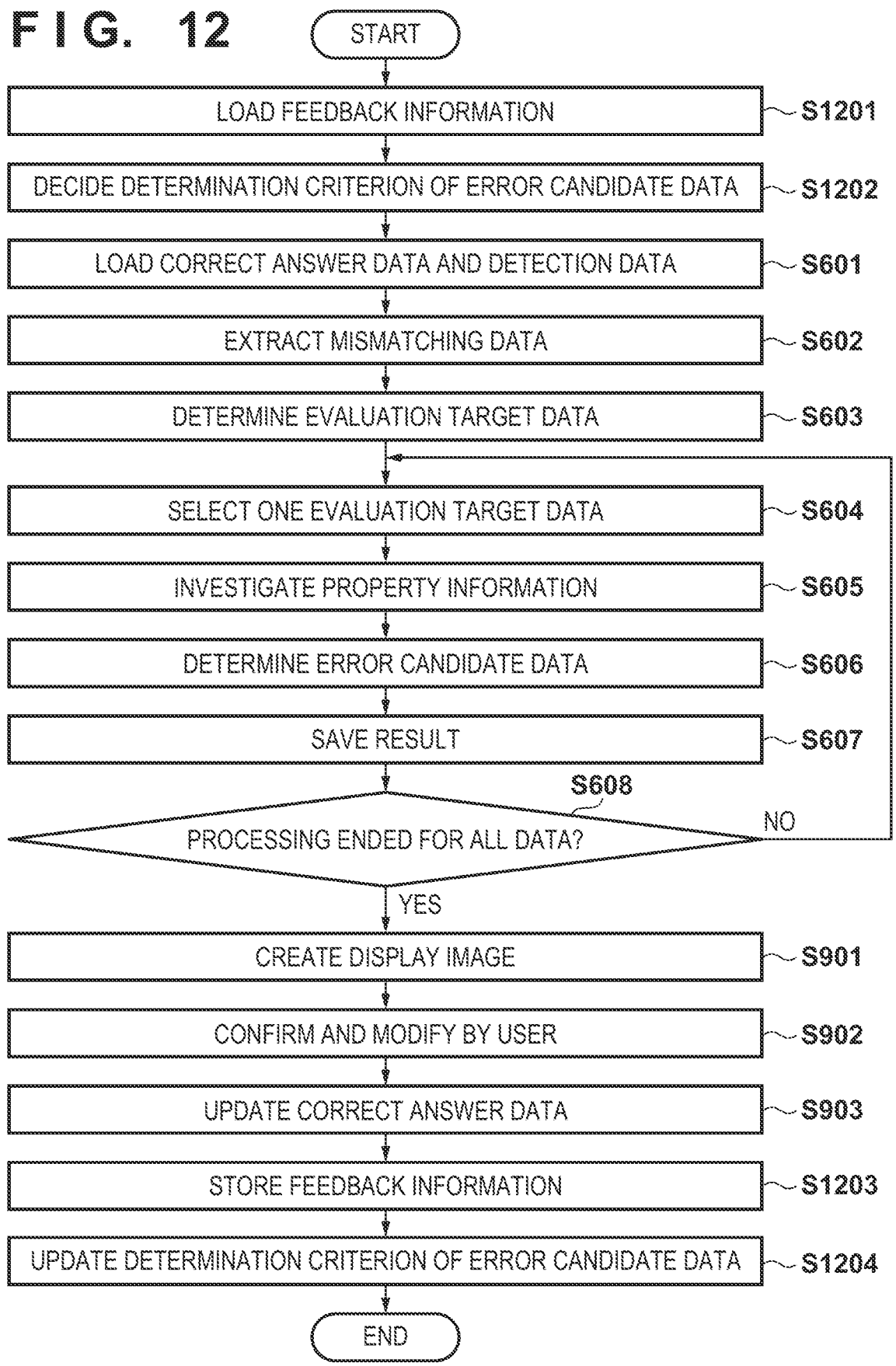
FIG. 12 is a flowchart showing the procedure of processing executed by the information processing apparatus according to the third embodiment.

In the third embodiment, as shown in FIG. 12, new processes are added to the start and the end of processing explained in the second embodiment with reference to FIG. 9. As the processes added to the start, processing of loading information fed back by the user from the accumulated information storage unit 910 by the criterion deciding unit 920 (step S1201) and processing of deciding the determination criterion of error candidate data by the criterion deciding unit 920 (step S1202) are added. These processes can be performed at any stage before error candidate data is determined in step S606.

As the processes added to the end, processing of storing the information fed back by the user in the accumulated information storage unit 910 (step S1203) and processing of updating the determination criterion of error candidate data by the criterion deciding unit 920 (step S1204) are added. Note that all the added processes need not always be executed for each image and may be executed for a plurality of images at once.

As described above, according to this embodiment, pieces of information fed back by the user are collected, and the determination criterion of error candidate data is decided using these pieces of information. When the information fed back by the user is used in this way, error candidate data according to the tendency of determination of the user can be determined from evaluation target data.

Fourth Embodiment

In the first to third embodiments, a case in which a crack is the detection target has been described. However, the target of the present invention is not limited to this, and the present invention can be used even for another case. In the fourth embodiment, a region segmentation problem will be exemplified. In the first to third embodiments, in the processing of the evaluation target data determination unit 120, when the position of overdetection data and the position of a portion reliable as correct answer data are adjacent positions, the overdetection data is determined as evaluation target data.

On the other hand, in the fourth embodiment, an example in which overdetection data is determined as evaluation target data in a case in which a reliable portion and overdetection data do not exist at adjacent positions but exist within a predetermined range will be described. Additionally, in the first to third embodiments, an example in which the property investigation unit 130 investigates the shape information of evaluation target data has been described. In the fourth embodiment, however, an embodiment in which property information other than a shape is investigated will be described. Note that the apparatus arrangement is the same as in the above-described embodiments, and a detailed description thereof will be omitted.

Figure 13:
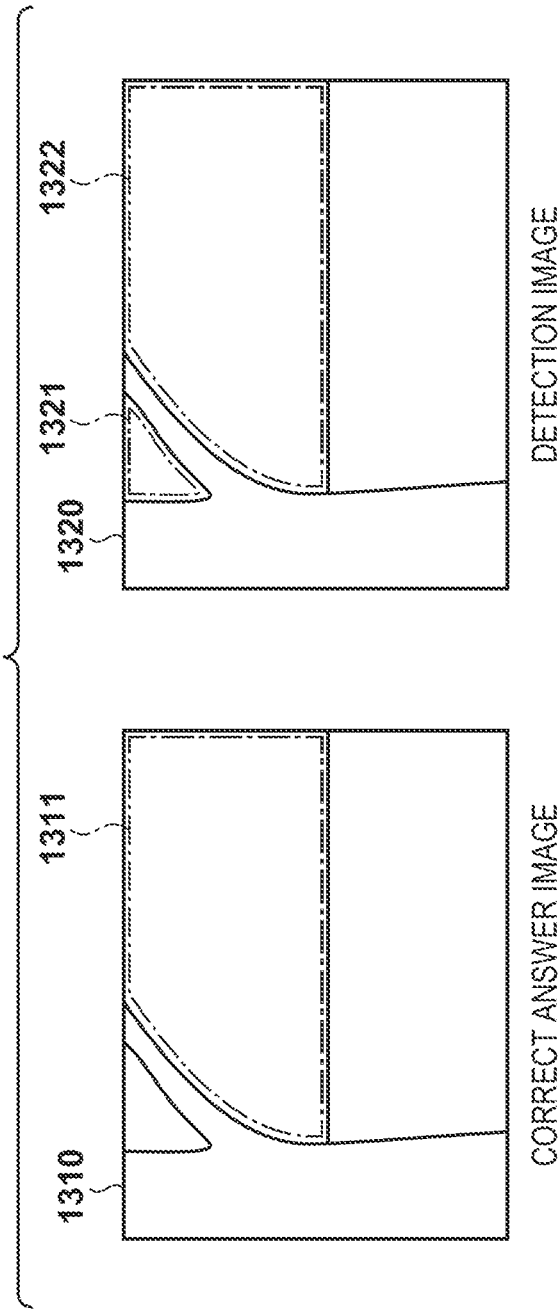
FIG. 13 is a view showing correct answer images and detection images according to the fourth embodiment.

Processing of estimating an uninput portion of correct answer data of a sky region in the region segmentation problem will be described first with reference to FIG. 13. In an image shown in FIG. 13, the sky region is segmented into two regions by a branch of a tree. In a correct answer image 1310, correct answer data is input only in a region 1311. On the other hand, in a detection image 1320, regions 1321 and 1322 are detected as detection data.

First, an evaluation target data determination unit 120 determines overdetection data from the detection data. When the correct answer image 1310 and the detection image 1320 are collated, it can be determined that the overdetection data is the region 1321. Next, evaluation target data is determined from the overdetection data. In the image 1310, a portion reliable as correct answer data in which the position of the correct answer data matches the position of the detection data is the region 1311. The region 1311 that is the reliable portion and the overdetection data 1321 do not exist at adjacent positions. However, since they exist within the range of a predetermined distance, the overdetection data 1321 is determined as evaluation target data.

Next, a property investigation unit 130 investigates the property information of the evaluation target data 1321. For example, the region 1311 that is a reliable portion and the region of the evaluation target data 1321 on the original image are extracted, and pieces of property information such as color information, brightness information, and texture information are obtained. Subsequently, if the difference between the reliable portion and the property information of the evaluation target data falls within a predetermined range, an error candidate data determination unit 140 determines the evaluation target data 1321 as error candidate data.

As described above, according to this embodiment, in a case in which a portion reliable as correct answer data and overdetection data do not exist at adjacent positions but exist within a predetermined range, the overdetection data is determined as evaluation target data. Then, it is determined, based on the property information of the evaluation target data, whether the evaluation target data is error candidate data.

This makes it possible to determine error candidate data even if the portion reliable as correct answer data and the overdetection data are not adjacent.

Fifth Embodiment

In the fifth embodiment, as an example of application to another case, a method of applying the present invention to time-series data to track the locus of a person or an object will be described. In this embodiment, the detection target is a person, and an uninput portion of a correct answer data set on a time series is modified. Note that the apparatus arrangement is the same as in the above-described embodiments, and a detailed description thereof will be omitted.

Figure 14B:
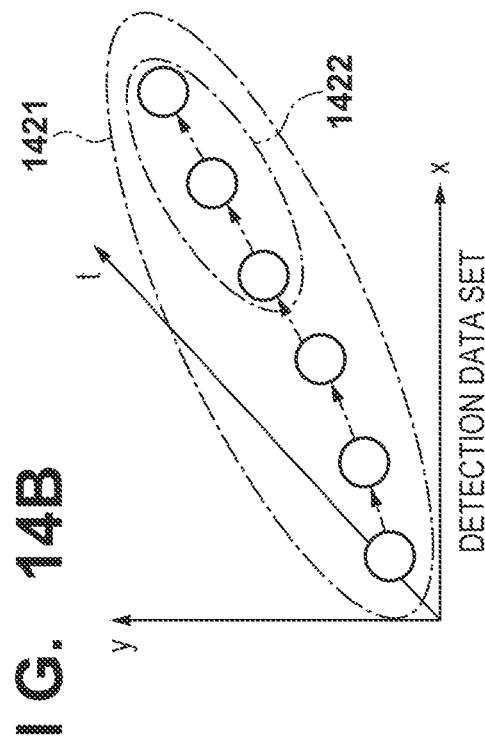
FIGS. 14A and 14B are views showing a correct answer data set and a detection data set according to the fifth embodiment.
Figure 14A:
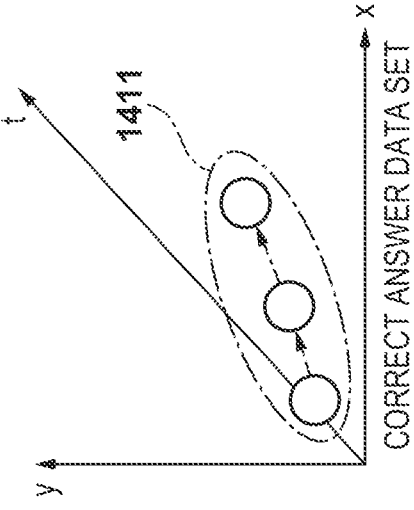

Processing contents according to this embodiment will be described with reference to FIGS. 14A and 14B. In FIGS. 14A and 14B, an open circle means the label of a person, and a state in which the person moves in the directions of arrows with respect to the time base is shown.

First, a correct answer data set and a detection data set on the time series are prepared in a correct answer/detection data storage unit 110. FIG. 14A shows the correct answer data set. A data set surrounded by an alternate long and two short dashed line 1411 is a data set to which a correct answer label is assigned. FIG. 14B shows the detection data set. A data set surrounded by an alternate long and two short dashed line 1421 is a set of detected data.

Next, an evaluation target data determination unit 120 extracts overdetection data from the detection data. When the correct answer data set and the detection data set are collated, the overdetection data is a data set 1422 of the detection data set. Next, the evaluation target data determination unit 120 determines evaluation target data from the overdetection data. Here, a set of reliable data in which the position of the correct answer data set matches the position of the detection data set is the data set 1411. The data set 1422 that is the overdetection data exists within a predetermined time from the reliable data set 1411 and is therefore determined as evaluation target data.

Next, a property investigation unit 130 investigates, as property information, the direction of the moving object of the correct answer data and the direction of the moving object of the evaluation target data, and the color information of the original image at the position of the evaluation target data. After that, based on the property information, an error candidate data determination unit 140 determines whether the evaluation target data 1422 is error candidate data.

As described above, according to this embodiment, it is possible to estimate an uninput portion of correct answer data on the time series.

Sixth Embodiment

In the first to fifth embodiments, the method of estimating an uninput portion in errors of correct answer data set has been described. In the sixth embodiment, however, a method of estimating not only an uninput portion but also an error input portion will be described. In this embodiment, the detection object is a human face, and if correct answer data is smaller than ideal correct answer data, it is estimated that an uninput portion is present. On the other hand, if correct answer data is larger, it is estimated that an error input portion is present. Note that the apparatus arrangement is the same as in the above-described embodiments, and a detailed description thereof will be omitted.

Figure 15A:
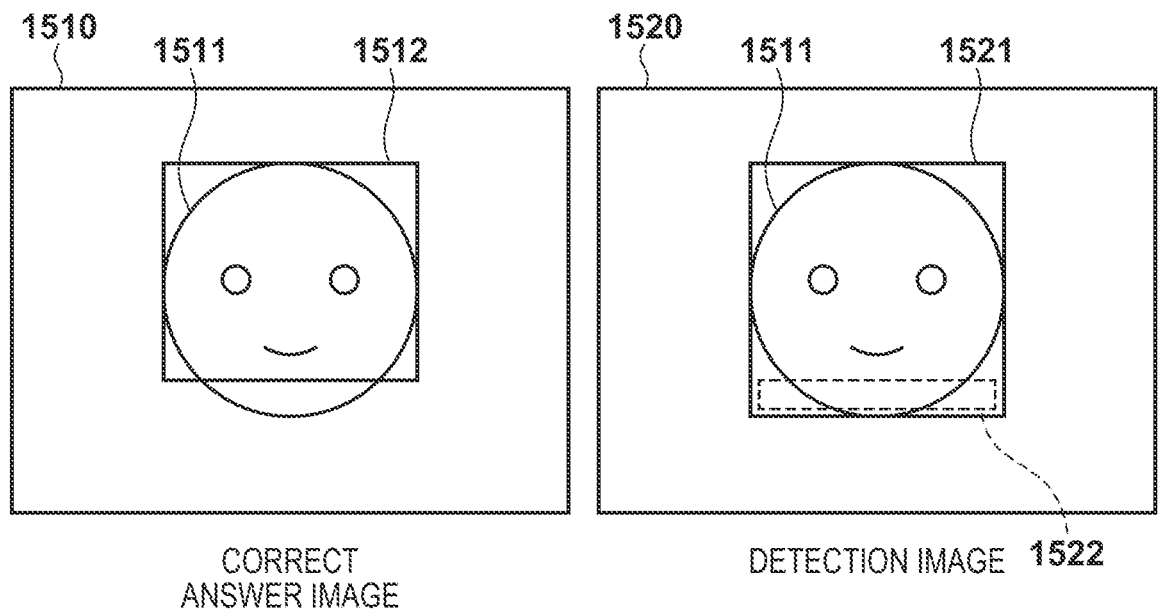
FIGS. 15A and 15B are views showing correct answer images and detection images according to the sixth embodiment.

A method of estimating an uninput portion of correct answer data will be described first with reference to FIG. 15A. An image 1510 is a correct answer image, an image 1520 is a detection image, and a region 1511 represents a human face. A region 1512 is correct answer data, and a region 1521 is detection data. The correct answer data and the detection data are collated by an evaluation target data determination unit 120, and overdetection data is extracted as mismatching data. Here, the correct answer image 1510 is subtracted from the detection image 1520, thereby extracting a region 1522 indicated by a broken line as overdetection data. Next, it is determined whether the overdetection data is evaluation target data. In FIG. 15A, a reliable portion where the correct answer data matches the detection data is the region 1512. The overdetection data 1522 is located at a position adjacent to the region 1512 that is the reliable portion and can therefore be determined as evaluation target data.

Next, an error candidate data determination unit 140 determines, based on property information investigated by a property investigation unit 130, whether the evaluation target data is error candidate data. On the original image, color information, brightness information, and texture information are obtained as property information in each of the evaluation target data 1522 and the region 1512 that is the reliable portion.

If the pieces of property information in both regions are similar, the evaluation target data 1522 is an uninput portion of the correct answer data at a high possibility and, therefore, is determined as error candidate data. On the other hand, if the pieces of property information in both regions are not similar, the evaluation target data 1522 is not an uninput portion of the correct answer data but a mere error detection portion at a high possibility and, therefore, is not determined as error candidate data. Note that to determine whether the pieces of property information are similar, a method of calculating the similarity between the property information based on the color information, the brightness information, and the texture information and determining whether the similarity is equal to or more than a threshold may be used.

By the above-described method, an uninput portion of correct answer data can be estimated.

Figure 15B:
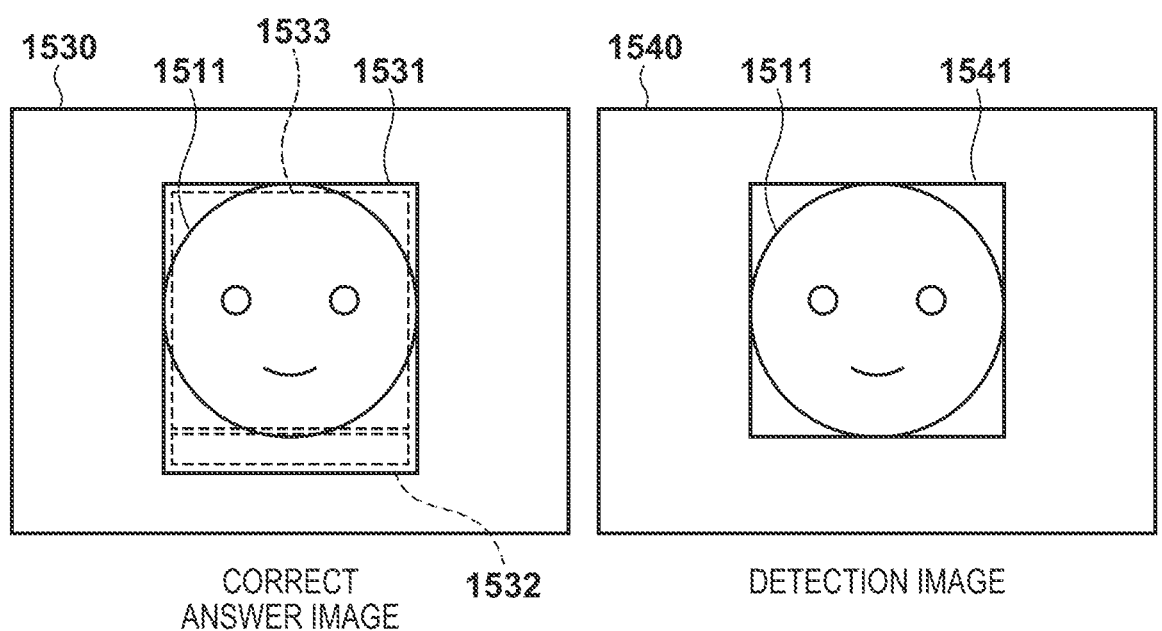

A method of estimating an error input portion of correct answer data will be described next with reference to FIG. 15B.

An image 1530 is a correct answer image, and an image 1540 is a detection image. In addition, a region 1531 is correct answer data, and a region 1541 is detection data. The evaluation target data determination unit 120 extracts overdetection data as mismatching data from the correct answer data. Here, the detection image 1540 is subtracted from the correct answer image 1530, thereby extracting a region 1532 indicated by a broken line as overinput data of the correct answer data. Next, it is determined whether the overinput data is evaluation target data. In FIG. 15B, a reliable portion where the correct answer data matches the detection data is a region 1533 indicated by a broken line. The overinput data 1532 is located at a position adjacent to the region 1533 that is the reliable portion and can therefore be determined as evaluation target data. Next, the error candidate data determination unit 140 determines, based on property information investigated by the property investigation unit 130, whether the evaluation target data is error candidate data. On the original image, color information, brightness information, and texture information are obtained as property information in each of the evaluation target data 1532 and the region 1533 that is the reliable portion.

If the pieces of property information in both regions are similar, the evaluation target data 1532 is determined not as an error input portion of the correct answer data but as correct answer data. On the other hand, if the pieces of property information in both regions are not similar, it is determine that the evaluation target data 1532 is an error input portion of the correct answer data at a high possibility and, therefore, is determined as error candidate data. Note that to determine whether the pieces of property information are similar, a method of calculating the similarity between the property information and determining whether the similarity is equal to or more than a threshold may be used, as in the case of estimation of an uninput portion.

By the above-described method, an error input portion in errors of correct answer data set can be estimated.

Note that the information processing apparatus according to the present invention can be used to modify not only an image or time-series data but also correct answer data of three-dimensional spatial data.

According to the present invention, it is possible to estimate an error portion of correct answer data for each part of a detection object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-167660, filed Aug. 31, 2017, which is hereby incorporated by reference wherein in its entirety.

What is claimed is:

1. An information processing apparatus that selects re-learning data to be used in machine re-learning of a learned model, comprising:
   one or more processors, wherein the one or more processors function as:
   a loading unit configured to load, from a storage unit that stores sets of correct answer data and detection data, correct answer data representing a region of pixels of a detection target in a detection image and detection data representing a region of pixels in the detection image of the detection target detected by predetermined detection processing;
   an extraction unit configured to extract a mismatching region of pixels, in which regions of pixels of the detection target represented by the correct answer data and the detection data do not match, based on a difference in stored pixel values of the regions of pixels of the detection target represented by the correct answer data and the detection data;
   an estimation unit configured to estimate whether the correct answer data may contain an error, based on property information representing i) a shape of the mismatching region of pixels and/or ii) image information of a region of the detection image corresponding to the mismatching region of pixels; and
   a re-learning data selection unit that (i) includes the detection image in the re-learning data to be used in the machine re-learning of the learned model in a case where the estimation unit estimates, based on the property information representing i) the shape of the mismatching region of pixels and/or ii) the image information of the region of the detection image corresponding to the mismatching region of pixels, that the correct answer data does not contain the error and that (ii) excludes the detection image from the re-learning data to be used in the machine re-learning of the learned model in a case where the estimation unit estimates, based on the property information representing i) the shape of the mismatching region of pixels and/or ii) the image information of the region of the detection image corresponding to the mismatching region of pixels, that the correct answer data contains the error.

2. The apparatus according to claim 1, wherein the extraction unit extracts, as the mismatching region of pixels, a region of pixels in which regions of pixels of the detection target represented by the correct answer data and the detection data do not match, the region of pixels being within a predetermined range from a region of pixels in which regions of the detection target represented by the correct answer data and the detection data match.

3. The apparatus according to claim 2, wherein the predetermined range is a range of a predetermined distance or a predetermined area from the region of pixels in which regions of the detection target represented by the correct answer data and the detection data match.

4. The apparatus according to claim 1, wherein the extraction unit extracts the mismatching region of pixels that is adjacent to a region of pixels in which regions of the detection target represented by the correct answer data and the detection data match.

5. The apparatus according to claim 1, wherein the estimation unit estimates that the correct answer data may contain an error in a case where a region of pixels represented by the correct answer data has not yet been input as a region of pixels of the detection target in the correct answer data.

6. The apparatus according to claim 1, wherein the estimation unit estimates that the correct answer data may contain an error in a case where a region of pixels represented by the correct answer data has been incorrectly input as a region of pixels of the detection target in the correct answer data.

7. The apparatus according to claim 1, wherein the estimation unit estimates whether the correct answer data may contain an error based on image information of a region of pixels of the detection image corresponding to a region in which regions of pixels of the detection target represented by the correct answer data and the detection data match.

8. The apparatus according to claim 1, wherein the property information includes at least one piece of shape information of a linearity, an angle, a circularity, a length, and a loop count of the mismatching region of pixels.

9. The apparatus according to claim 1, wherein the property information includes at least one of color information, brightness information, and texture information of a region of pixels of the detection image corresponding to the mismatching region of pixels.

10. The apparatus according to claim 1, wherein the one or more processors further function as:
    a presentation unit configured to present an estimation result by the estimation unit to a user.

11. The apparatus according to claim 10, wherein the presentation unit further presents i) at least one of a character and an image used to show a reason for promotion of confirmation of the estimation result, or ii) a region of pixels in the detection image represented by the correct answer data that may contain the error.

12. The apparatus according to claim 10, wherein the presentation unit further presents i) property information of another mismatching region of pixels similar to the mismatching region of pixels and ii) whether or not an estimation result by the estimation unit with respect to the another mismatching region of pixels is correct that is based on an input from a user.

13. The apparatus according to claim 12, wherein the one or more processors further function as:
    a criterion deciding unit configured to decide a criterion relating to an estimation by the estimation unit, in accordance with i) property information of the another mismatching region of pixels and ii) whether or not an estimation result by the estimation unit with respect to the another mismatching region of pixels is correct that is based on an input from a user, wherein the estimation unit estimates whether the correct answer data may contain an error in accordance with a criterion decided by the criterion deciding unit.

14. The apparatus according to claim 1, wherein the one or more processors further function as:
a confirmation unit configured to confirm whether or not an estimation result by the estimation unit is correct based on an input from a user.

15. The apparatus according to claim 1, wherein the one or more processors further function as:
an accepting unit configured to accept a modification of the correct answer data.

16. The apparatus according to claim 15, wherein the one or more processors further function as:
an updating unit configured to update the correct answer data by reflecting the modification accepted by the accepting unit to the correct answer data.

17. The apparatus according to claim 1, wherein the one or more processors further function as:
a criterion deciding unit configured to decide a criterion relating to an estimation by the estimation unit, in accordance with i) an attribute selected from among a plurality of attributes included in the property information based on a user instruction as being used for an estimation by the estimation unit and ii) a reference value of a value relating to the attribute, set based on a user instruction, wherein the estimation unit estimates whether the correct answer data may contain an error in accordance with a criterion decided by the criterion deciding unit.

18. The apparatus according to claim 1, wherein the estimation unit estimates whether a region of pixels of the correct answer data corresponding to the mismatching region of pixels contains an error.

19. The apparatus according to claim 1, wherein the estimation unit estimates that there is an error in the detection data, in a case where the property information represents that the shape of the mismatching region of pixels is a shape that cannot be the detection target.

20. The apparatus according to claim 1, wherein the estimation unit estimates whether the correct answer data may contain an error by a method using machine learning.

21. The apparatus according to claim 1, wherein the detection target is a person, a face, or a crack on a structure.

22. A method of controlling an information processing apparatus that selects re-learning data to be used in machine re-learning of a learned model, comprising:
loading, from a storage unit that stores sets of correct answer data and detection data, correct answer data representing a region of pixels of a detection target in a detection image and detection data representing a region of pixels in the detection image of the detection target detected by predetermined detection processing;
extracting a mismatching region of pixels, in which regions of pixels of the detection target represented by the correct answer data and the detection data do not match, based on a difference in stored pixel values of the regions of pixels of the detection target represented by the correct answer data and the detection data;
estimating whether the correct answer data may contain an error, based on property information representing i) a shape of the mismatching region of pixels and/or ii) image information of a region of the detection image corresponding to the mismatching region of pixels;
including the detection image in the re-learning data to be used in the machine re-learning of the learned model in a case where it is estimated, based on the property information representing i) the shape of the mismatching region of pixels and/or ii) the image information of the region of the detection image corresponding to the mismatching region of pixels, that the correct answer data does not contain the error; and
excluding the detection image from the re-learning data to be used in the machine re-learning of the learned model in a case where it is estimated, based on the property information representing i) the shape of the mismatching region of pixels and/or ii) the image information of the region of the detection image corresponding to the mismatching region of pixels, that the correct answer data contains the error.

23. A non-transitory computer-readable storage medium storing a computer program for causing a computer to execute a method of controlling an information processing apparatus that selects re-learning data to be used in machine re-learning of a learned model, the method comprising:
loading, from a storage unit that stores sets of correct answer data and detection data, correct answer data representing a region of pixels of a detection target in a detection image and detection data representing a region of pixels in the detection image of the detection target detected by predetermined detection processing;
extracting a mismatching region of pixels, in which regions of pixels of the detection target represented by the correct answer data and the detection data do not match, based on a difference in stored pixel values of the regions of pixels of the detection target represented by the correct answer data and the detection data;
estimating whether the correct answer data may contain an error, based on property information representing i) a shape of the mismatching region of pixels and/or ii) image information of a region of the detection image corresponding to the mismatching region of pixels;
including the detection image in the re-learning data to be used in the machine re-learning of the learned model in a case where it is estimated, based on the property information representing i) the shape of the mismatching region of pixels and/or ii) the image information of the region of the detection image corresponding to the mismatching region of pixels, that the correct answer data does not contain the error; and
excluding the detection image from the re-learning data to be used in the machine re-learning of the learned model in a case where it is estimated, based on the property information representing i) the shape of the mismatching region of pixels and/or ii) the image information of the region of the detection image corresponding to the mismatching region of pixels, that the correct answer data contains the error.

* * * * *